United States Patent [19]

Nash, Jr. et al.

[11] Patent Number: 5,327,997
[45] Date of Patent: Jul. 12, 1994

[54] LUBRICATION MANAGEMENT SYSTEM

[75] Inventors: Robert V. Nash, Jr., St. Charles; Bruce E. Meyer, Joliet, both of Ill.

[73] Assignee: Temprite, Inc., West Chicago, Ill.

[21] Appl. No.: 7,470

[22] Filed: Jan. 22, 1993

[51] Int. Cl.⁵ .................. F01M 1/18; F01M 11/10
[52] U.S. Cl. ........................ 184/6.4; 184/96; 184/97; 184/103.2; 184/108; 73/290 R; 73/304 R; 73/319; 62/468
[58] Field of Search ............ 184/6.4, 96, 97, 103.1, 184/103.2, 108; 73/290, 304, 319; 62/84, 468; 324/207.16, 204, 207.26

[56] References Cited

U.S. PATENT DOCUMENTS

| | | |
|---|---|---|
| 2,246,244 | 6/1941 | Consley . |
| 3,500,962 | 3/1970 | Kocher ........................... 184/103.1 |
| 3,621,670 | 1/1970 | Kinney ........................... 184/103.2 |
| 3,633,377 | 1/1972 | Quick ............................... 62/468 |
| 4,428,208 | 1/1984 | Krause . |
| 4,530,215 | 7/1985 | Kramer ............................... 62/84 |
| 4,627,280 | 12/1986 | Hayashi et al. ................. 73/290 R |
| 4,845,986 | 7/1989 | Hayashi et al. ................. 73/290 R |
| 5,103,648 | 4/1992 | Barbier . |
| 5,113,671 | 5/1992 | Westermeyer . |

OTHER PUBLICATIONS

Grasso Refrigeration Equipment, "Solid State Liquid Level Control," Model NCA221, NCA222, and NCA223 product literature, Publication date unknown.
AC&R Components Inc., "Electronic Oil Level Controller," Cat. No. S-9300 product literature, publication date unknown.

*Primary Examiner*—Thomas E. Denion
*Attorney, Agent, or Firm*—Juettner Pyle & Lloyd

[57] ABSTRACT

A lubrication management system controls the lubricant quantity in multiple refrigeration compressor lubricant sumps. A buoyant member is placed in the lubricant, where a float portion and a magnetically conductive portion rise or fall together. The sensor further includes a displacement transducer producing a variable electrical signal through a resonant frequency shift. The displacement transducer, in proximity with the magnetically conductive portion of the buoyant member, transforms motion of the magnetically conductive portion to changes in resonant frequency shift in proportion to the position of the magnetically conductive element relative the displacement transducer. The system also includes circuitry for receiving the signal and comparing the signal to an adjustable set point, from which the circuitry determines whether an output for signalling a need for additional lubricant is necessary. A solenoid valve may be opened in response to the circuitry output to feed lubricant to the sump from a remote reservoir.

26 Claims, 7 Drawing Sheets

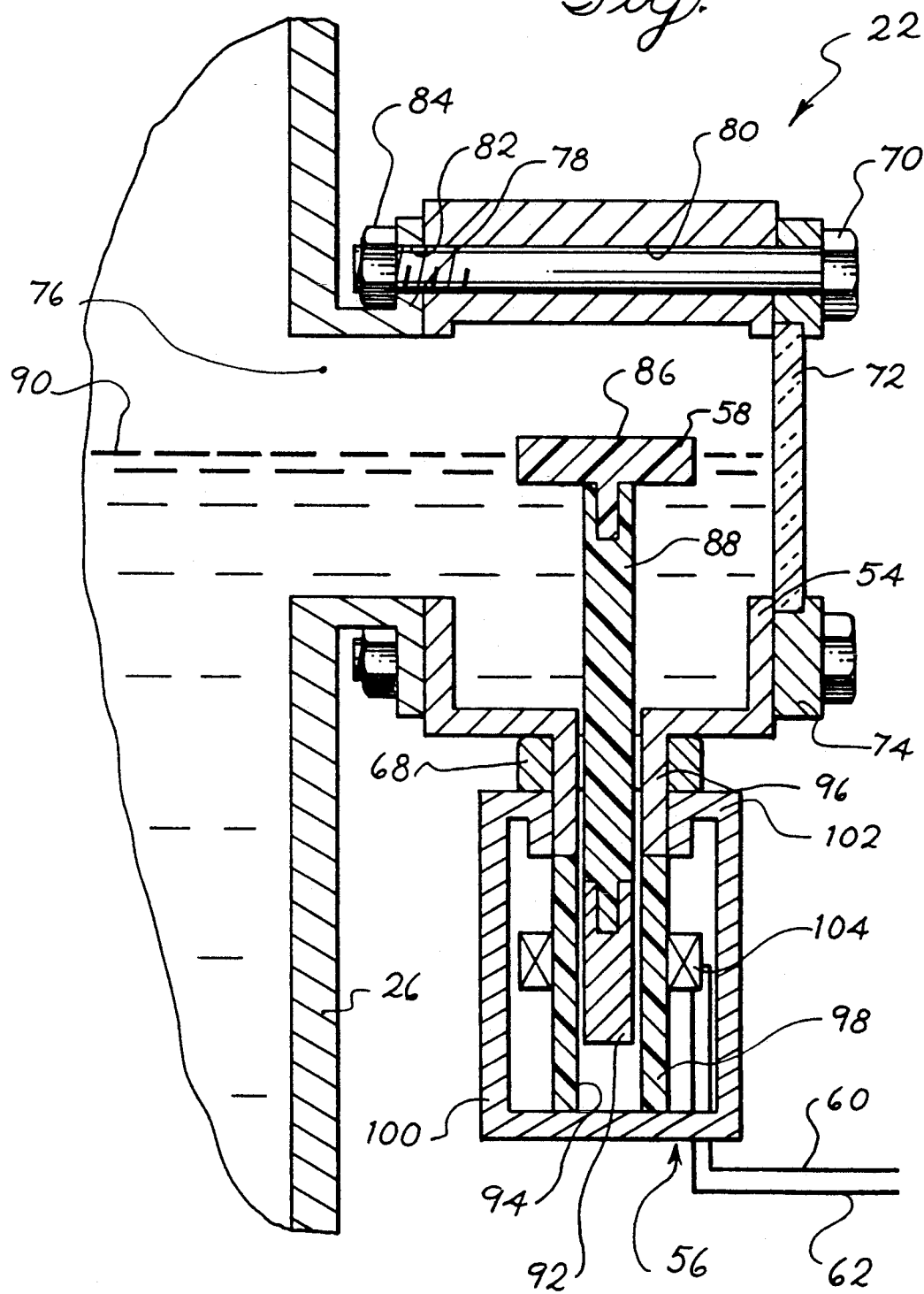

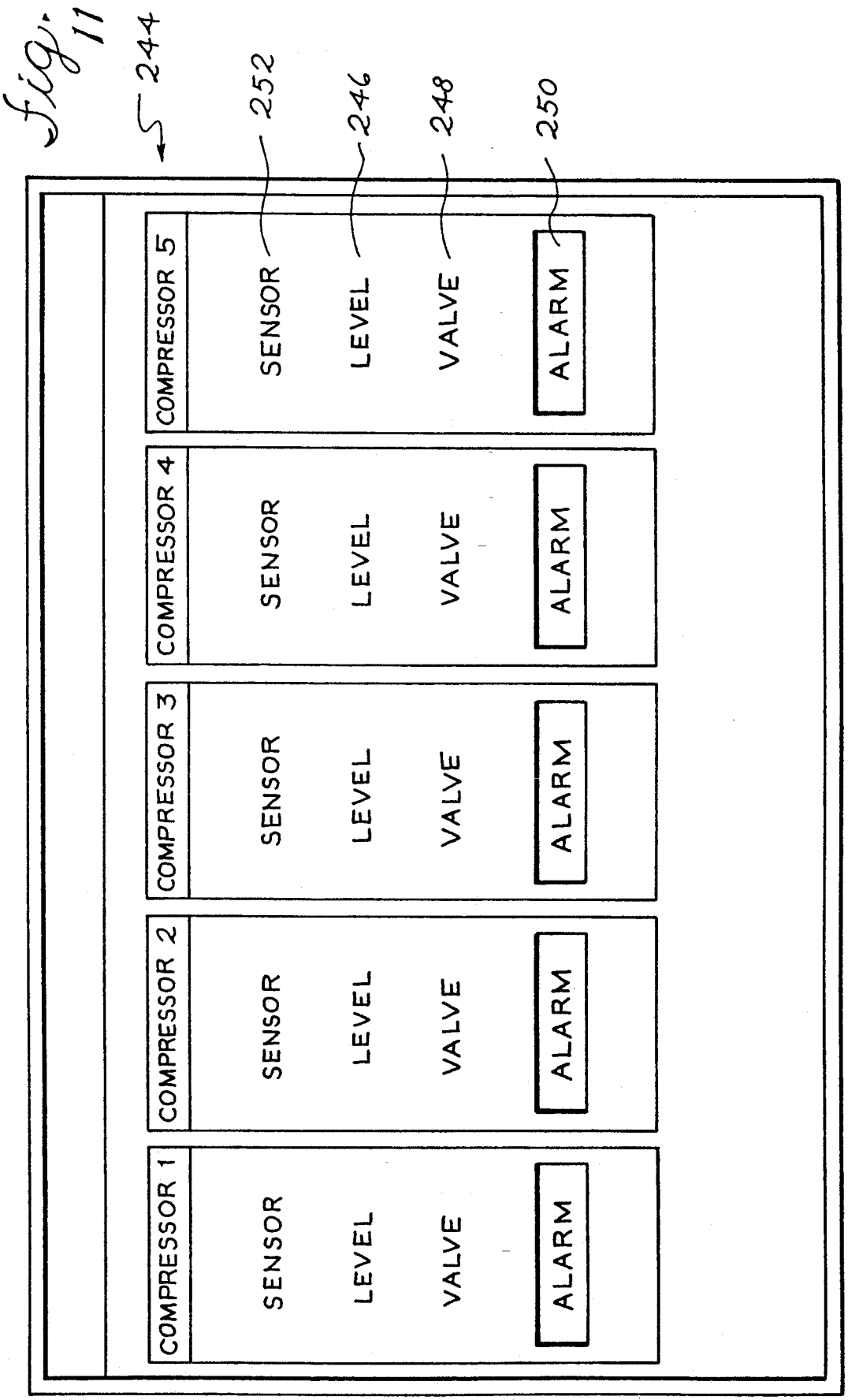

LUBRICATION MANAGEMENT SYSTEM

BACKGROUND OF THE INVENTION

1. Field of the Invention

A lubrication management system is disclosed for the operation of machines requiring a minimum level of lubricant in a lubricant sump. More particularly, a lubrication management system for refrigeration system compressors utilities a float member with a magnetically conductive portion in combination with a displacement transducer to provide an automatic feedback signal to a circuit for control of a normally closed solenoid valve in selective communication with a lubricant reservoir, such that the circuit can control the level of lubricant in the sump through replenishment from the reservoir to at least a minimun required level.

2. Description of the Prior Art

In commercial and industrial refrigeration systems, particularly units with parallel compressors, there is a need to accurately control the lubricant level in the compressor's sump or crankcase. Most refrigeration compressors utilize liquid lubricants for lubrication and internal cooling. The compressor is the heart of a refrigeration system and the most expensive component, typically costing more than all the other parts combined. If the proper lubricant level is not obtained and maintained (i.e., a lubricant sump level that is too high or too low), the compressor can be quickly destroyed through "burn-out" (the insufficient lubricant condition) or rendered grossly inefficient or "slugged" (the excessive lubricant condition).

Moreover, insufficient lubricant and resulting compressor "burn-out" can cause contamination of the refrigerant system and refrigerant plumbing. Cleaning out a refrigeration system contaminated with from a "burn-out" can often be one of the most costly service charges a unit will ever require other than replacement of the compressor. Indeed, all refrigeration compressors pass or "pump" lubricant through their refrigerant discharge lines due to machining tolerance limitations, the refrigerant fluid's miscibility with most lubricants, overall compressor design, pressure drops across the sump and various other design or system factors.

This lubricant contamination of the refrigerant discharge lines is even more significant with parallel compressor systems which utilize several refrigeration compressors, usually of a semi-hermetic type, sharing a common suction and discharge line. When lubricant is inadvertently pumped out of the compressor sump into the refrigerant circuit, the lubricant is directed through the system's evaporator, expansion valve, and condenser, and is eventually returned to the compressors still entrained in the refrigerant. Since such parallel compressor configurations share a common refrigerant supply or suction line and a common suction manifold at different locations while often operating under different duty cycles, the returning refrigerant (and lubricant contaminant) does not necessarily return to the exact compressor from whence it came at the same rate or quantity. In the presence of a common suction line and different duty cycles, lubricant can move from one compressor to another. Thus, minimization of lubricant contamination of the refrigerant and plumbing is a very high priority of virtually all systems.

A reverse contamination process is also possible, where the feed lubricant may contain entrained refrigerant. When lubricant is allowed into the compressor sump, it is possible that this contaminated refrigerant will circulate within the sump and be drawn into the compression chamber of the compressor. The common refrigerant supply or suction line and a common suction manifold can thus be further contaminated with undesirable lubricant.

One or more lubricant separators are commonly used on the compressor discharge lines to lower the amount of lubricant lost to the refrigerant. The lubricant is captured by the lubricant separator and returned to a common remote lubricant reservoir, previously filled with a large pre-charge of lubricant. The lubricant in the common lubricant reservoir is then ready to be returned to the individual compressor sumps as needed.

Over the years, there have developed several methods to maintain a minimum level of lubricants in the compressor sumps, as well as generally any fluid in a containment vessel. Such methods have been especially devoted to the needs of internal combustion engines and compressors, where hydraulic delivery of lubricants such as oil to the machine elements in relative motion is an absolute necessity in avoiding premature wear of the moving elements. Typically, such machines incorporate a sump or similar containment vessel placed in the lower regions of the machine for storage of the lubricant while a separate lubricant portion is circulating throughout the machine and delivered to the machine elements likely to experience wear. Thus, as a minimum level of lubricant in the sump is necessary to maintain the wear reducing and cooling function of the lubricant, it is often necessary to replenish the sump with additional lubricant during or after machine operation in the face of the lubricant losses caused by the reasons stated above. To properly accomplish this replenishment and lubricant management, it is first necessary to measure the existing level of the lubricant in the sump.

The most basic method of managing the level of lubricant in the sump as described above is through a dip stick or sight glass. With a dip stick, the level of oil is measured by the insertion of a stick of known and calibrated length into the lubricant sump a known and fixed distance. The level of the lubricant, adhering to the stick when the stick is withdrawn from the sump, can be readily determined by the length of adhered lubricant on the stick compared to the calibration marks on the stick. Such methods, although extremely commonplace, suffer from the disadvantage that only the oil existing in the sump at the time of the measurement can be determined. Subsequent loss of lubricant, such as through leaks, will not be determined until subsequent dip stick measurements are taken. Moreover, if it is determined that lubricant must be added, this addition must occur as a separate step and is often a messy and imprecise undertaking. In extreme cases, overfilling of the lubricant sump can create hydrolocking of the machine, where the pump hydraulically delivering the lubricant is caused to attempt to compress a column of lubricant, an essentially incompressible fluid. Severe structural damage is often caused during such events. Further, where multiple machines are in service, a common arrangement for stationary installations such as refrigeration system compressors, the need for more frequent attention increases.

Subsequent refinements include the use of lubricant pressure sensors in conjunction with the use of dip sticks. The pressure sensors measure the pressure generated during the hydraulic delivery of the lubricant to the wear elements, typically through comparative resistance sensors or piezo electric transducers. If the pressure drops below a predetermined level, the sensor indicates that the lubricant sump is in need of additional lubricant. However, such systems usually signal the need for additional lubricant only after an extreme need arises and are incapable themselves of adding the additional lubricant necessary.

Alternatives to dip stick methods include sight glasses provided in the side of the sump itself. Usually provided in stationary engines or compressors, visual inspection of the sight glass allows an operator to continuously monitor the level of lubricant in the sump and take appropriate action to add lubricant if the level falls below some predetermined level. However, such systems again only provide an indication of the need for additional lubricant and are incapable themselves of adding the additional lubricant necessary. Thus, operator attentiveness is a further requirement, especially in the presence of foam often occurring through churning of the lubricant due to the motion of operating elements therein.

As an alternative to purely manual systems, mechanical float systems were developed and applied to lubricant sumps, especially where multiple machines are in operation and the use of a central lubricant reservoir can be used to service the separate lubricant sumps of several machines simultaneously. Each of the lubricant sumps is provided with a float in fluid communication with the lubricant in the sump and mechanically linked with a float valve interspersed between the common reservoir and the individual lubricant sump. When the lubricant level in the sump drops below a predetermined level, the float mechanically linked with the valve opens the valve and allows lubricant to flow from the common reservoir to the lubricant sump in need of replenishing. Such a device is disclosed in U.S. Pat. No. 4,428,208 to Krause.

These mechanical float valves, however, are not very accurate and have a high failure rate due to compressor sump pressure pulsations and vibration. If failure of the float valve occurs and the compressor lubricant level drops, insufficient lubricant can result in "burn-out" due to main bearing scoring and/or input motor overheating.

Moreover, liquid refrigerant mixing with the gases in the sump and contributing to foaming of the lubricant in the sump can open the float valve and cause false feeding of lubricant into the sump. A high lubricant level of liquid refrigerant in the crankcase can cause the compressor to "slug" as lubricant is encouraged to enter the compressor compression chamber, which is designed to compress only a vapor. Excessive liquid pressurization caused by such a "slug" can damage a compressor's pistons, rings, connecting rods, crank shaft, or exhaust valves.

Moreover, such mechanical float valves typically have metal seats and valve needles, in an effort to improve durability in the presence of the compressor's pulsations and vibrations. Such needle valves are not "bubble tight" upon closure and can allow refrigerant to enter the compressor's sump through the lubricant feed and introduce lubricant-entrained refrigerant into the common discharge lines and to the common suction manifolds as described above. This can decrease system capacity. Moreover, transient lubricant level fluctuations tend to cause opening of the needle valve which can, in some instances, result in overfilling of the lubricant sump, creating the potential for hydrolocking the machine or "slugging" as noted above.

Optical sensors have also been recently developed for application to sensing the level of lubricant in lubricant sumps. An example is U.S. Pat. No. 5,103,648 to Barier. Therein, an optical sensor is used in conjunction with a sight glass to determine the level of the lubricant in the sump. When an insufficient lubricant level is determined, a solenoid valve in combination with the sensor is activated to allow additional lubricant into the sump and thereby replenish the quantity of lubricant in the sump to safe levels. However, it has been found with such optical systems that foaming of the lubricant can result in a false signal calling for the addition of lubricant when none may be needed. Further, the optical units have a high maintenance and failure rate and a low repeatability due to contaminants in a refrigeration system's working environment and compressor vibrations.

In additional to optical systems, capacitance and inductive sensors have been tried, but have been found unsatisfactory as they do not capably distinguish between lubricant, liquidified refrigerant, foaming lubricant, various types of lubricants and refrigerant, contaminated systems, or any of these combinations.

SUMMARY OF THE INVENTION

In accordance with the identified shortcomings of past systems and the desired improvements sought in the systems of the prior art, a lubrication management system for a plurality of refrigeration compressors was developed where each of the compressors is provided with a lubricant sump containing a quantity of lubricant, the quantity of lubricant (and the resulting lubricant level) therein being subject to fluctuation due to various operational features of the compressor. A central lubricant reservoir is placed in selective fluid communication with each of the lubricant sumps by way of a plurality of corresponding solenoid valves each having a normally closed condition and a selective open condition to maintain the quantity of lubricant in the sumps at a safe level.

Each of the lubricant sumps are further provided with a lubricant level sensor, the sensor having a float assembly in fluid communication with the lubricant and further comprised of a float portion and a magnetically conductive portion. Both portions of the float assembly rise or fall together within a range of motion relative to the lubricant sump in accordance with the fluctuations in the lubricant level within a prescribed range of motion. Thus, an upper limit in this range of motion corresponds to the sump having a full quantity of lubricant and a lower limit in this range of motion corresponds to the sump having an insufficient quantity of lubricant.

The sensor is further comprised of a displacement transducer which provides a variable electrical signal at a frequency which is determined by a variable inductance resonant circuit. The variable inductor is composed of a coil which encircles the magnetically conductive portion of the float assembly such that the magnetically conductive member can cause a change in the net circuit inductance and, therefore, shift the resonant frequency. The output frequency is thus a function of the position of the magnetically conductive member relative to the inductor which encircles it.

The receiving circuitry is characterized to produce an accurate correlation between the sensor output frequency and the float assembly position. The sensor circuitry employs a low Q coil in conjunction with a temperature dependent resistance and amplitude stabilization to produce an oscillator which exhibits little frequency drift over a wide temperature range and yet retains the capability to deviate thirty percent from a given center frequency. The output of the sensor and the power required by the sensor are conducted via a two wire polarity protected connection to the receiving circuitry.

Finally, the system circuitry for receiving the electrical signal compares the electrical signal to an adjustable predetermined set point from which the circuitry determines if an output suitable for signalling the level of the lubricant is necessary. The solenoid valve responds to the circuitry output corresponding to the lower limit in the range of motion which in turn corresponds to a low quantity of lubricant in the sump such that the solenoid valve open condition exists when the output corresponds to the sump having an insufficient quantity of lubricant.

Thus, an object of the present invention is to provide a lubricant management system which eliminates the need for manual measurement of a lubricant level in a lubricant sump through the use of an automatic feedback system.

A further object of the present invention is to provide a lubricant management system which eliminates the need for visual measurement of the lubricant level of a lubricant sump through the use of a float device in combination with a variable transducer, circuitry for analyzing the output signal of the transducer, a lubricant reservoir, and a solenoid in electrical combination with the circuity and selective fluid communication with the sump, such that displacement of the float in the downward direction results in a signal to open the solenoid and allow flow of lubricant to the sump from the reservoir.

An additional object of the present invention is to provide a lubricant management system that avoids excessive lubricant feeding to the sump through accurate feed signal creation and a positive shutoff solenoid.

Still another object of the present invention is to provide a lubricant management system that avoids lubricant contaminated refrigerant from feeding to the sump through a positive shutoff solenoid.

Another object of this invention to provide a lubricant management system that is capable of continuously and accurately measuring and automatically feeding the sump of a plurality of compressors from a common reservoir.

A further object of this invention to provide a cost effective lubricant management system that is capable of being retrofitted to a wide variety of existing compressor sumps.

Still another object of the present invention is to provide a lubricant management system that avoids operation of a feedback valve through mechanical linkage to the lubricant sensing device and false feeding arising therefrom.

Another object of the present invention is to provide a lubricant management system that is capable of distinguishing between lubricant, liquidified refrigerant, foaming lubricant, various types of lubricants and refrigerant, contaminated systems, or any of these combinations.

These together with other objects and advantages will become subsequently apparent from the details of the following described embodiment and operations thereof, reference being had to the accompanying drawings forming a part thereof, wherein like numerals refer to like parts throughout.

BRIEF DESCRIPTION OF THE DRAWINGS

Reference may be made to the following drawings illustrating the preferred embodiment of the present invention:

FIG. 5 is a sectional view of the sensing device taken along line 5—5 of FIG. 4 further illustrating the sensor housing, float assembly, and displacement transducer of the lubrication management system of the present invention;

FIG. 11 is a top view of the display panel of the lubrication management system of the present invention.

DETAILED DESCRIPTION OF THE PREFERRED EMBODIMENT

Figure 1:
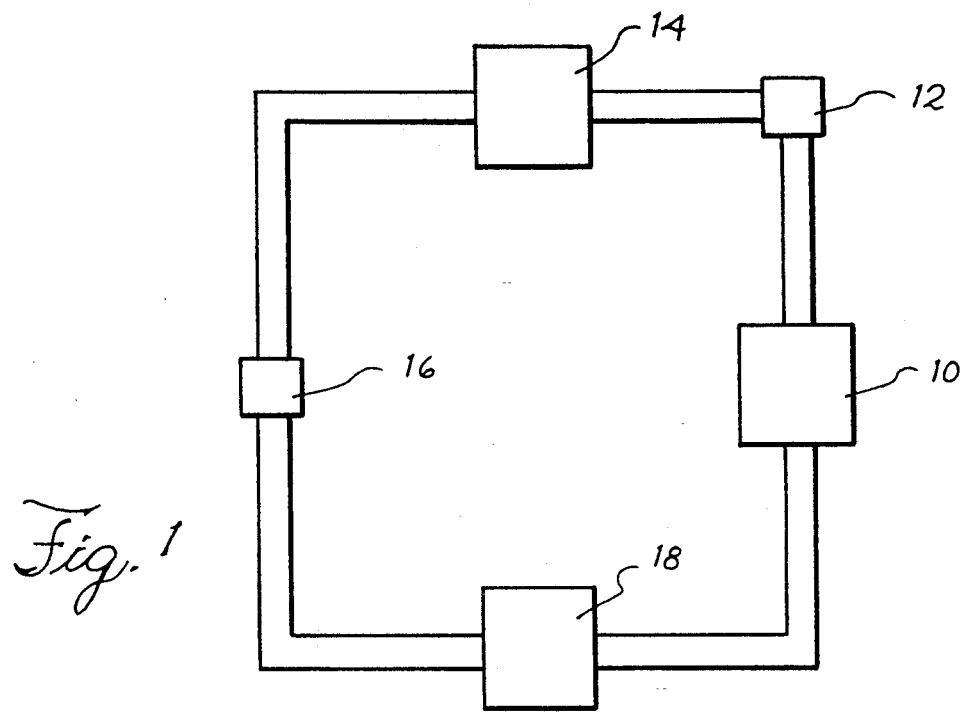
FIG. 1 a representational schematic of a refrigeration system for which the lubrication management system of the present invention is applicable.

Referring now to the figures, FIG. 1 shows an overall configuration of a refrigeration system to which the present invention may be applied. In the Figure, the overall refrigeration system 1 includes a compressor 10, oil separator 12, condenser 14, expansion valve 16, and evaporator 18. The refrigerant, such as Freon 22 from DuPont, is initially compressed in the compressor 10 in the gaseous state and passed through the oil separator 12 to remove hydrocarbons (usually in the form of entrained oil) from the refrigerant. The oil separator 12 subsequently returns this recovered oil to an oil reservoir 40, which will be discussed below. After passing through the oil separator 12, the refrigerant flows to a condenser 14, where heat energy (enthalpy) is isoentropically lost to a heat sink and the refrigerant condenses to the liquid state. The refrigerant is then passed through an expansion valve 16 to reduce the temperature of the refrigerant. After the expansion valve 16, the refrigerant is then passed to an evaporator 18 where heat from the object or containment vessel to be cooled is absorbed. The refrigerant is then returned to the compressor 10 to complete the cycle.

Figure 2:
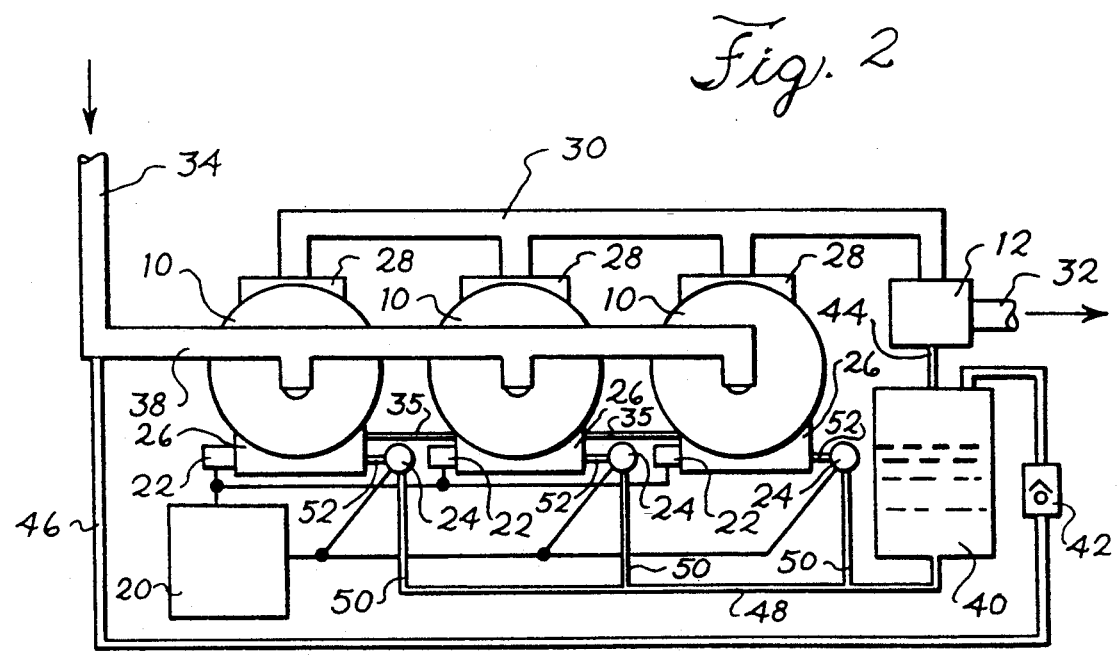
FIG. 2 is a more detailed representational schematic of the compressor bank of the refrigeration system of FIG. 1 for which the lubricant management system of the present invention is applicable.

FIG. 2 is a more detailed representational schematic of a compressor bank of the refrigeration system of FIG. 1 to which the lubricant management system of the present invention is applicable. As shown in FIG. 2, the overall arrangement of compressor system of the present invention may be appreciated, which consists of three main components, a controller 20, a level sensor 22, and a normally closed solenoid valve 24 in combination with a device having a sump or crankcase 26, such as each of the compressors 10. It should be appreciated from the forthcoming details that the lubrication management system of the present invention can be advantageously employed in conjunction with other devices having a sump or crankcase subject to fluctuations in lubricant level, including internal combustion engines, especially internal combustion engines for stationary power production.

In the embodiment shown, each individual compressor 10 is in refrigerant communication with an outlet 28 and common outlet manifold 30. Although three compressors 10 are shown, any number of compressors 10 can be employed. In the preferred embodiment of the present invention, preferably five such compressors 10 may advantageously employ this new and beneficial lubrication management system. The common outlet manifold 30 is directed to the oil separator 12, as discussed above, and further to the condenser 14 though pipe 32.

The return of the refrigerant is obtained through pipe 34 exiting the evaporator 18. The refrigerant is then directed to a common intake manifold 38 and delivered to each compressor 10 as required by the duty cycle of the compressor 10.

As the compressor 10 is a machine generating considerable friction between machine elements in relative motion, lubricant must be constantly provided to these machine elements to minimize wear. Commonly, lubricant sumps 26 are used to provide a reliable source of lubricant for further distribution within the machine. As noted above, maintaining the proper lubricant in these sumps 26 has been a recurring difficulty and the primary object of the present invention.

Thus, each of the compressors 10 is provided with a sensor 22 and a normally closed solenoid 24. Each of the sumps 26 are in turn replenished through the common remote lubricant reservoir 40. The lubricant reservoir 40 is provided with a pre-charge of lubricant sufficient to maintain operations for a considerable period of time. The lubricant reservoir 40 is also replenished in operation through pipe 44 returning the recovered hydrocarbons from the oil separator 12. A pipe 46 provides refrigerant pressure to the reservoir 40 through check valve 42 from the pipe 34 to prevent a vacuum from developing within the reservoir and avoiding vapor lock which could interfere in lubricant feed from the reservoir 40 to the sumps 26. Any excessive lubricant in any of the sumps 26 flows from one to another through pipes 35 to equalize this excess.

Lubricant is selectively delivered to each of the sumps 26 according to the present invention through lubricant manifold 48 and individual compressor lubricant delivery lines 50. The lines 50 each terminate at a normally closed solenoid valve 24, where lubricant can be selectively allowed therethrough and pass through a pipe 52 to the sump 26.

Figure 3:
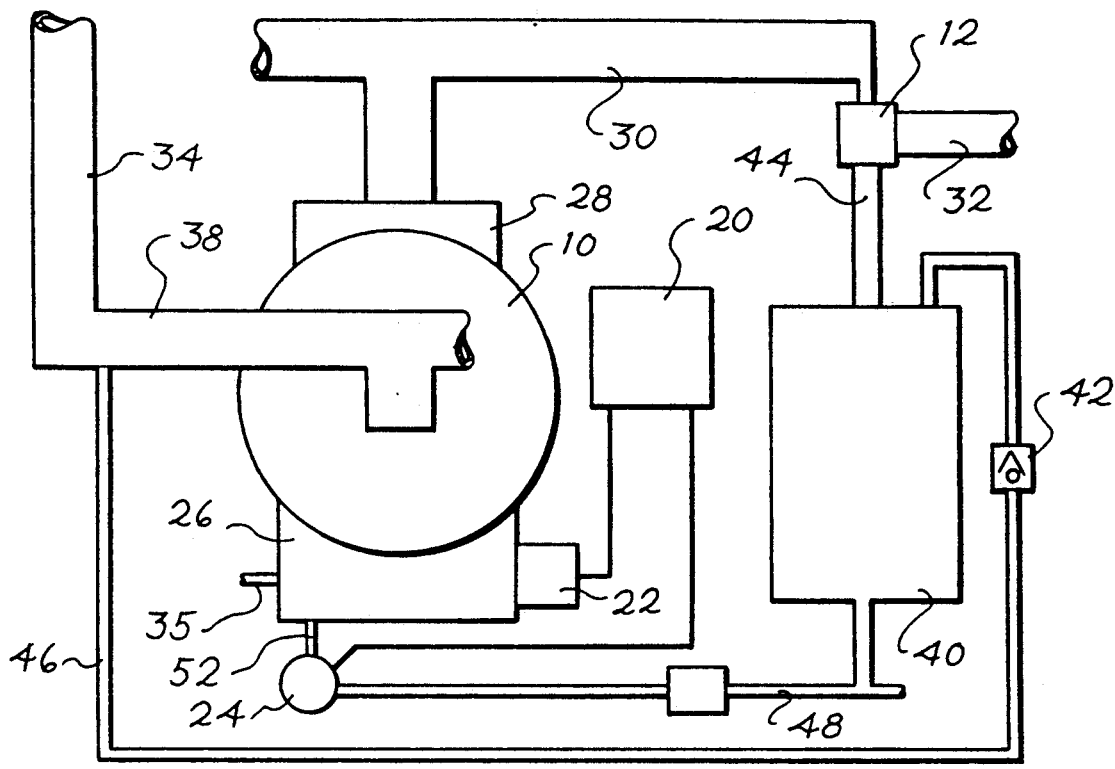
FIG. 3 is a still more detailed representational schematic of one of the compressors of FIG. 2, wherein the sump, sensing device, controller, and lubricant reservoir according to the lubricant management system of the present invention are shown.

The sensor 22 of the present invention is mounted to the sump and is in fluid communication with the sump lubricant. Preferably, the flange for the sight glass originally provided with the sump 26 can be used to permit application of the present invention to older compressors 10 and sumps 26. Referring to FIG. 3, additional detail can be discerned through the representative schematic of one of the compressors 10 shown in FIG. 2. Sensor 22 is shown therein mounted in place of the original sight glass of the compressor 10, the original sight glass 72 and front housing face 74 being reattached to the sensor 22. However, it should noted that the sensor 22 can be placed anywhere on the sump 26 level with the lubricant level therein to be monitored.

The sensor 22 is placed in electrical connection with the controller 20. The controller 20 is further in electrical connection with the normally closed solenoid valve 24 such that the controller 20 can remotely place the normally closed solenoid valve 24 in the open condition by energization of the normally closed solenoid valve 24.

Figure 4:
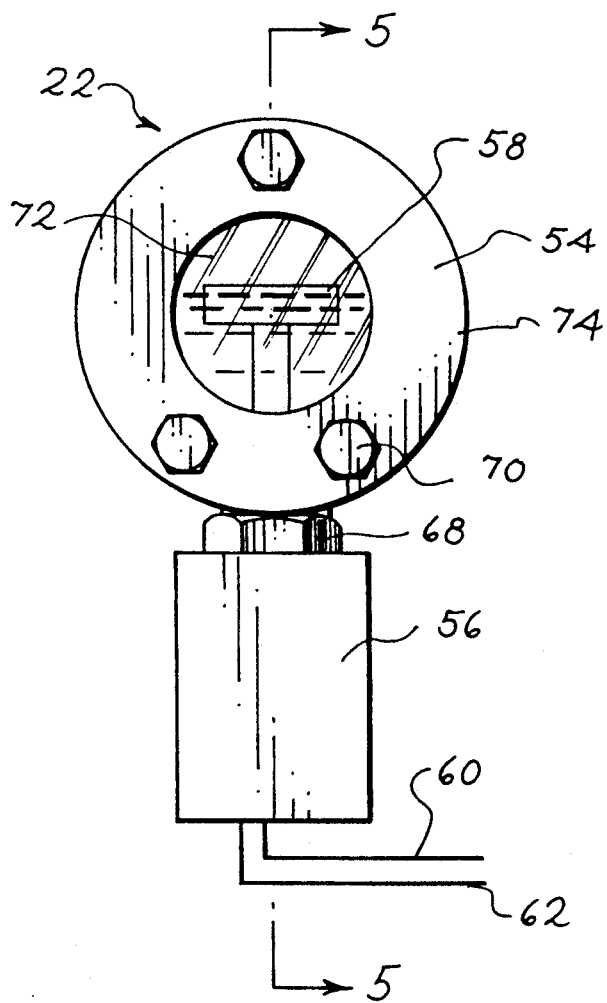
FIG. 4 is a front view of the sensing device, including the sensor housing, float assembly, and displacement transducer, of the lubrication management system of the present invention.

As shown in detail in FIG. 4, the sensor 22 of the present invention consists of a sensor housing 54 and displacement transducer 56, joined through a spacer nut 68 to rigidly connect each to the other, as will be discussed below. Seen within the sensor housing 54 and behind the sight glass 72 and front housing face 74 is a float assembly 58. Affixing the front housing face 74 to the sensor housing 54, and in turn the sensor housing to the sump 26, are fasteners 70. From the displacement transducer 56, four electrical wires extend. These include the Q coil input line 60 and Q coil output line 62, as best shown in FIG. 5.

Lubricant from the sump 26 is allowed to enter the sensor housing 54 through a port 76, as shown in FIG. 5. The housing 54 is attached to the sump 26 through a flange 78 provided on the sump, the flange 78 typically originally provided for installation of the original sight glass, which may be removed and replaced with the sensor 22 of the present invention. One of the fasteners 70, a bolt, is shown extending through a hole 80 in the housing 54 and a hole 82 in the flange 78 and threaded through a nut 84.

The oil level present in the sump 26 is reflected within the sensor housing 54 through the float assembly 58. A flat nonmetallic float portion 86, preferably constructed from polyether polyurethane, is rigidly attached to a nonferrous stem portion 88, also preferably constructed from polyether polyurethane. The float assembly 58 is thus of an overall density or specific gravity relative the lubricant that the float assembly 58 floats in the lubricant and rises or falls with the lubricant in the sump 26. As may be seen, the lubricant in the sump 26 and the sensor housing 54 establishes a lubricant level 90.

The stem portion 88 is further provided with a ferrous element 92, the stem 88 and ferrous element 92 being placed within a tubular configuration 94 within a housing 100 of the displacement transducer 56. The tubular configuration is defined by an threaded collar 96 depending from the housing 54 and a tubular sleeve 98. The threaded collar is threaded into a tapped orifice 102 in the housing 100 and tightened in place through spacer nut 68 to rigidly connect the sensor housing 54 to the transducer housing 100.

The float assembly 58, centered within the tubular configuration 94 and restrained from lateral motion, allows the sensor 22 to work under adverse conditions, such as those caused by compressor pulsations and vibrations, which may encourage the lubricant to slosh around and laterally displace the float assembly 58. Moreover, due to the preferred sensing schedule as discussed below, these components allow an averaging affect on the lubricant level measurement over time. Also, since the float assembly 58 is not mechanically supported by other members and is primarily in contact only with the lubricant, wear is minimized.

The transducer 56 determines the relative position of the ferrous element 92 within the tubular configuration 94. Since the stem portion 88 is attached to the float portion 86, the float portion 86 is always maintained at the same level as the lubricant level 90 and at the same level as the lubricant level 90 existing in the sump 26. Sensing the relative position of the ferrous element 92 of the stem portion 88 within the transducer housing 100 is thus effective in allowing the sensor 22 to sense the actual lubricant level 90 in the sump 26.

The displacement transducer 56 generates a variable electrical signal to the controller 20 indicating the relative position of the float assembly 58 relative to the transducer housing 100. The controller 20 receives this signal, processes it and produces an appropriate output. In the preferred embodiment of the present invention, this output is used to open the normally closed solenoid 24 and activate an indicator lamp. However, other output configurations can be envisioned, including the use of an alarm bell, a compressor stop switch, or like outputs which as their goal prevent the operation of the compressor with an insufficient quantity of lubricant and signal the need for immediate replenishment of the lubricant sump to adequate levels.

The transducer 56 follows the change in lubricant level 90 in the sump 26 by the change in frequency of an inductance resonant circuit through a low Q coil 104. This is highly effective in eliminating wear and friction while simultaneously improving the resolution of the sensor 22. In operation, the Q coil 104 is disposed about the ferrous element 92 located on the stem portion 88 of the float assembly 58. The ferrous element 92, of course, is free to move vertically along the axis of the Q coil 104. A conditioned ac voltage is then applied to the coil 104. As will be discussed below, an inductance establishes a predetermined resonant frequency corresponding to a neutral position of the ferrous element 92, where any shift in the resonant frequency can be related to a corresponding change in the relative vertical position of the ferrous element 92 which electromagnetically effects the transducer inductance. This resonant frequency is modified by the variable inductance of the small diameter low Q coil 104 disposed about the magnetically conductive portion 92 of the float assembly 58 such that movement of the magnetically conductive member 92 causes a change in the net circuit inductance and, therefore, a shift in the net resonant oscillator frequency.

Figure 6:
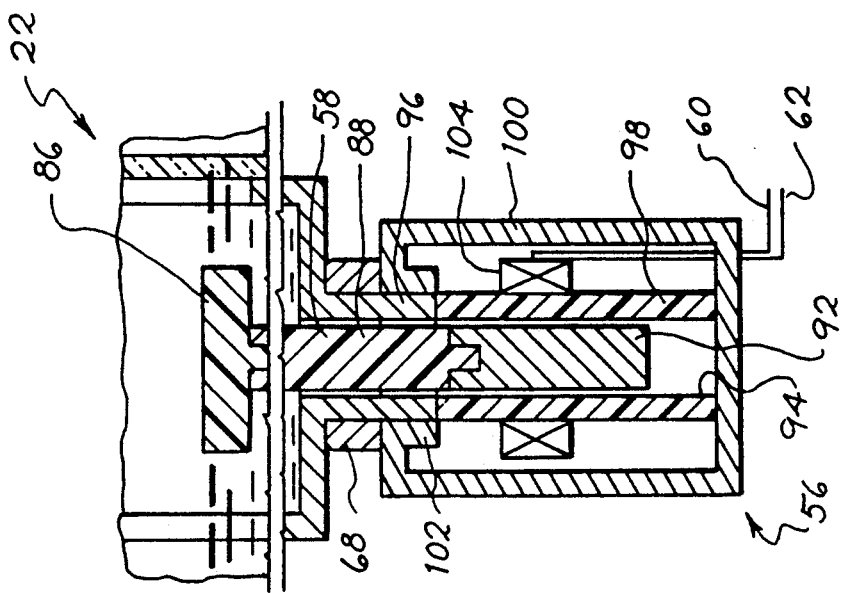
FIG. 6 is a sectional view taken along line 5—5 of FIG. 4 illustrating the neutral operative position of the sensing device according to the lubrication management system of the present invention.

The resonant frequency is preferably set such that when the ferrous element 92 is centered within the transducer housing 100, corresponding to the neutral predetermined level wherein the desired level in the sump 26 is obtained, the output resonant frequency is at 4.5 KHz. Such is the relative position shown in FIG. 6.

Figure 8:
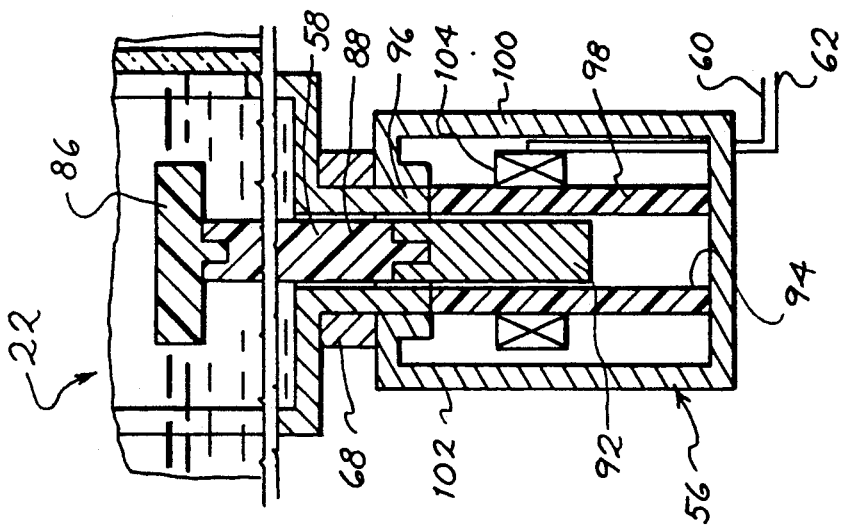
FIG. 8 is a sectional view taken along line 5—5 of FIG. 4 illustrating the elevated operative position of the sensing device corresponding to an excessive quantity of lubricant according to the lubrication management system of the present invention.
Figure 7:
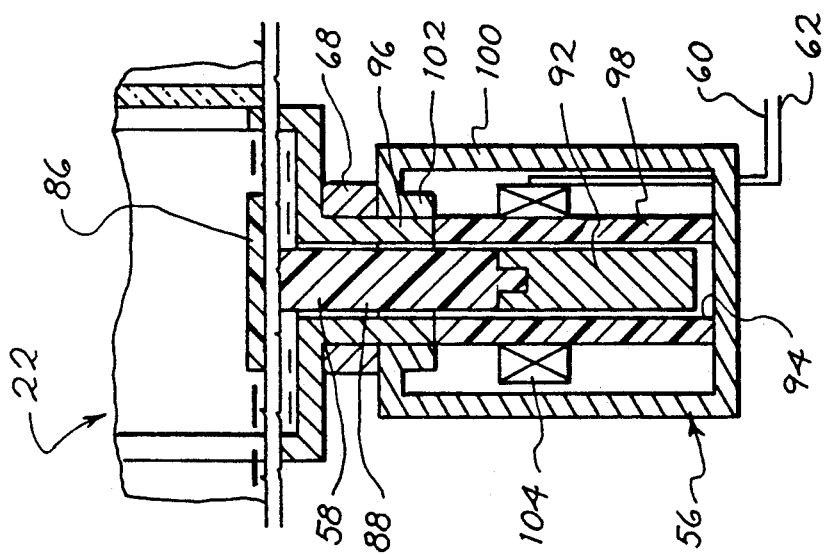
FIG. 7 is a sectional view taken along line 5—5 of FIG. 4 illustrating the depressed operative position of the sensing device corresponding to an insufficient quantity of lubricant according to the lubrication management system of the present invention.

When, however, the ferrous element 92 is vertically displaced off of this neutral position by fluctuation in the lubricant level 90 in the sump 26, as shown in FIGS. 7 or 8, the output resonant frequency will be modified in relation to this vertical displacement, and the output resonant frequency will be shifted (preferably plus or minus 2 KHz) depending on whether this displacement is above or below the neutral position. Thus, the transducer 56 has a range of motion sufficient to accommodate typical fluctuations in the lubricant level 90 in the sump 26 and requires negligible actuating force.

Figure 9:
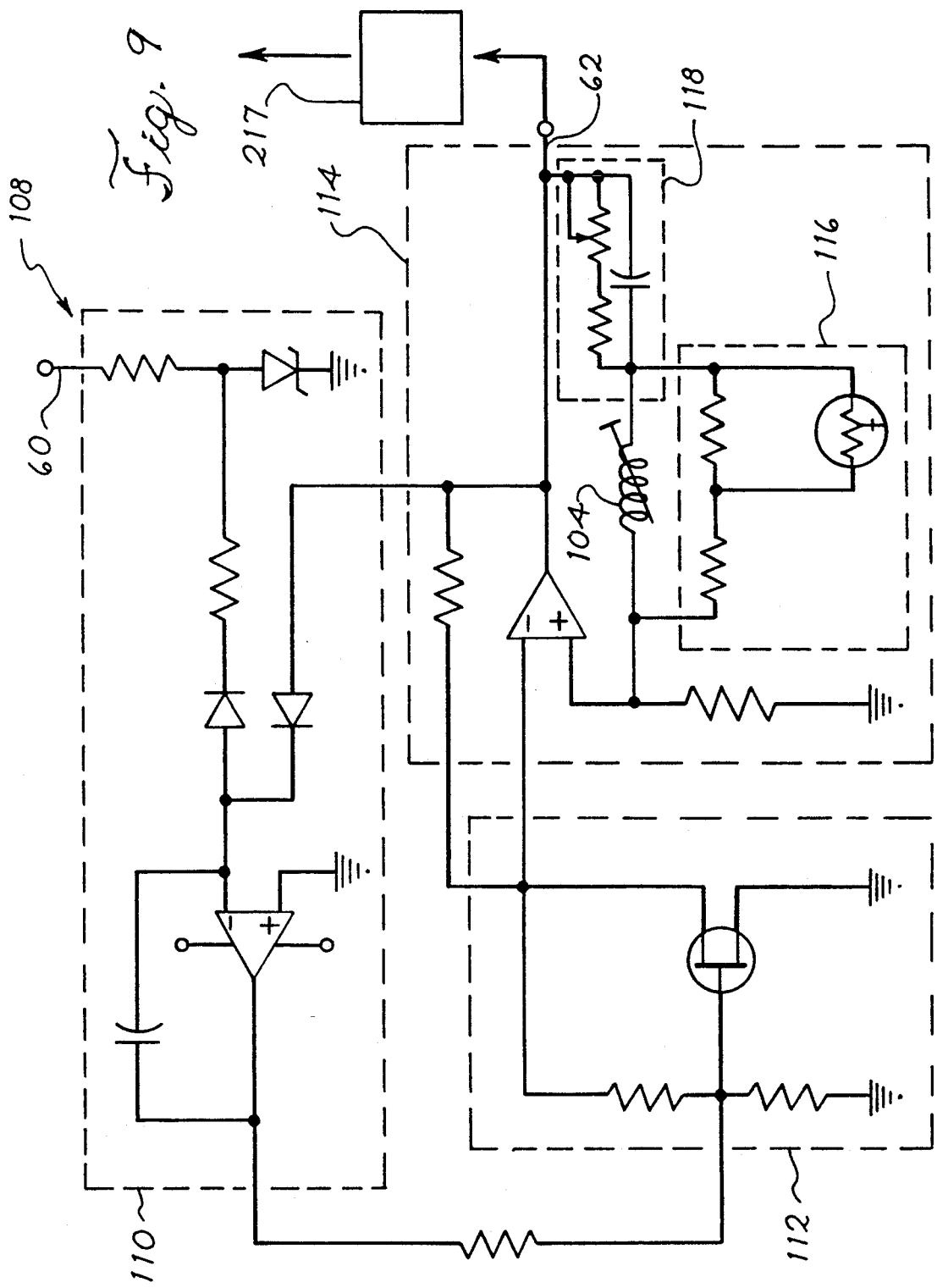
FIG. 9 is a circuit diagram depicting the preferred circuitry for the transducer of the lubrication management system of the present invention.

The transducer 56 comprises a circuit 108 providing temperature compensated amplitude-stabilized oscillation to generate a variable inductance resonant signal, as best shown in FIG. 9. An oscillator circuit 110 generates a primary electrical signal at a resonant frequency from the electrical power input of line 60. This signal is coupled to an amplifier circuit 112. The output of the amplifier circuit 112 is transmitted to inductance circuit 114, where the frequency of signal is varied by inductance coil 104 of the present invention. Additional factors, such as temperature and signal stability, are compensated by temperature adjustment block 116 and signal stabilization block 118.

The low Q coil 104 (preferably with a Q value less than or equal to 5) preferably contains 1000 turns of #32 wire on a 0.3 inch diameter stainless steel core. Thus, in conjunction with a temperature dependent resistance and signal stabilization, the circuit 108 exhibits little frequency drift over wide temperature ranges, yet retains the capability to deviate as much as thirty percent from a given center frequency. Moreover, the output of the transducer 56 and the power required by the transducer 56 are conducted via a two wire polarity protected connection to the controller 20.

Of course, other means to generate the inductive signal from coil 104 may be employed by those skilled in the art. In addition, the various electrical components may be adjusted to produce different frequency ranges, temperature variations, centering frequencies, and the like according to particular applications.

The output frequency is thus a function of the position of the magnetically conductive member 92 relative to the inductor coil 104 which encircles it. Although not a linear function, the receiving circuitry of controller 20 is adapted to produce an accurate correlation between the transducer 56 output frequency and the float assembly 58 position. The controller 20 which receives the electrical signal compares the electrical signal to an adjustable predetermined set point from which the controller 20 circuitry determines if an output suitable for signalling the level of the lubricant is necessary. The controller 20 preferably uses a phase-locked loop design providing a high degree of noise immunity and allowing the system to operate reliably in an industrial environment.

Figure 10:
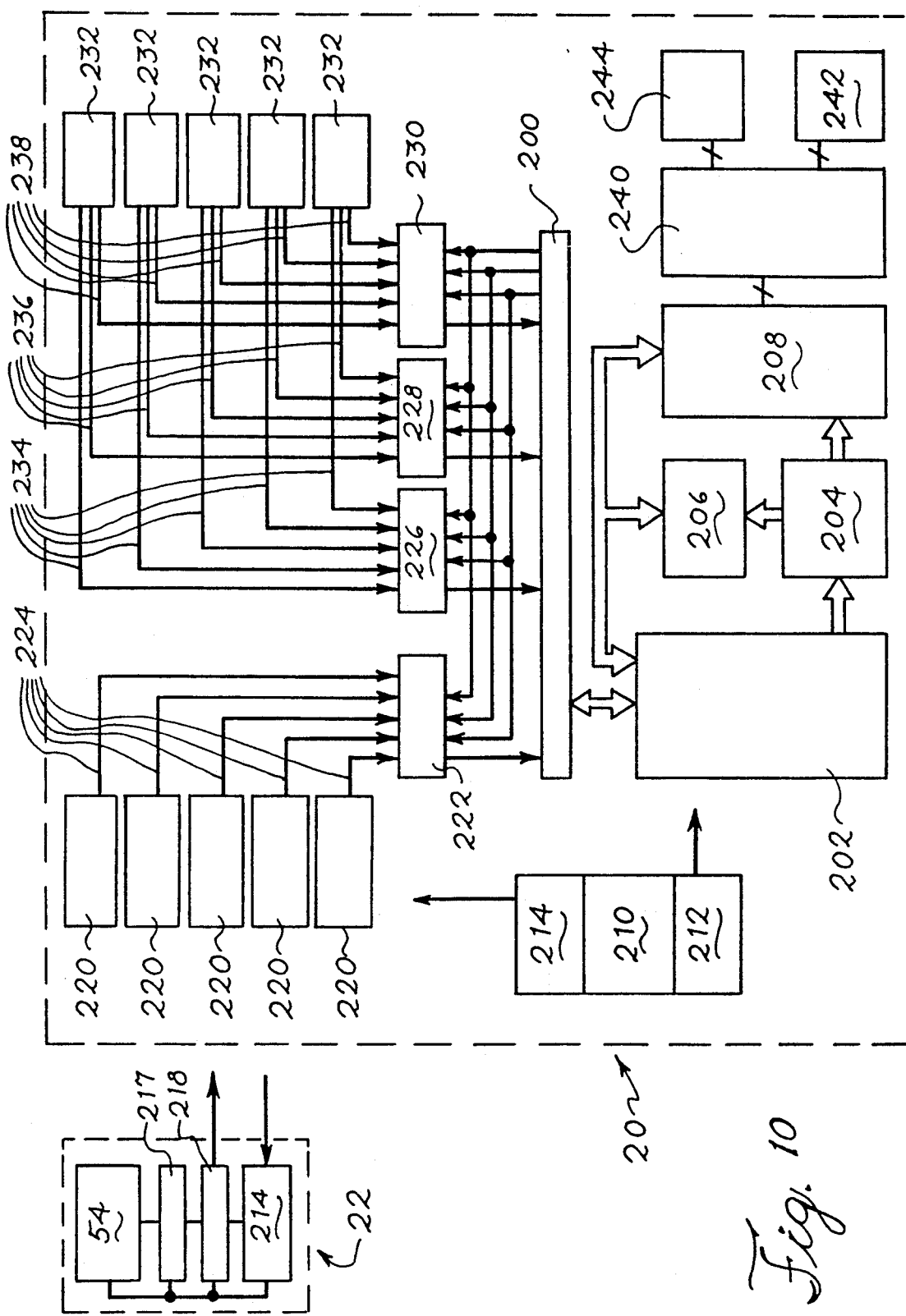
FIG. 10 is a block circuit diagram depicting the preferred architecture of the circuitry of the lubrication management system of the present invention.

The functional arrangement of the controller 20 is shown in FIG. 10. The controller 20 is preferably comprised of an I/O port 200 for receiving and transmitting to a processor 202. The processor 202 is further linked with an address decoder 204, which in turn handles data transmissions between an EPROM 206 and memory mapped I/O circuit 208. The processor 202 is also linked with the EPROM 206 and memory mapped I/O circuit 208 for direct data transmissions as is known in the art.

A common power supply 210 provides suitable power to the controller 20 and the sensor 22 through power supply modules 212 and 214, respectively. The sensor power supply module 214 is electrically connected to the sensor 22. The transducer 56 of the sensor 22 and a line driver 218 is thus powered. When the transducer 56 signal is obtained, it is divided by block 217 to 445 volts, nominal. The signal from that particular sensor 22 is then directed from the transducer 56 through a line driver 218 dedicated to that particular sensor 22. The signal is transmitted to a signal conditioning module 220, again dedicated to that particular sensor 22. In accordance with the preferred embodiment of the present invention, five such signal conditioning modules 220 are shown in FIG. 9. Each of the signal conditioning modules 220 are placed in alternating communication with sensor multiplexers 222 through corresponding lines 224.

The controller 20 then proceeds to the set point multiplexer 226, 228, and 230, where a frequency signal from a set point select module 232 preset with the desired lubricant level 90 according to the corresponding compressor 10 and sump 26 is waiting as data input. In the preferred embodiment, the three set point multiplexers 226, 228, and 230 each represent one of three alternate adjustable set points, which preferably correspond to a level of ¼, ⅜, or ½ of the original sight glass provided with a particular compressor, respectively, and can be adapted to each compressor. Each of the preferably five compressors can be preset to the original manufacturer's recommended lubricant sump 26 level selecting one of the three set points. The controller 20 of the present invention can be provided with detailed information on the desired relative levels of the lubricant within each of the compressor sumps 26, even if the compressor sumps 26 are not identical or share the same level requirements. Thus, the present invention can be applied to a large range of existing compressor systems through a single unit.

Each of the setpoint select modules 232, uniquely and adjustably preset for a particular compressor 10, provides a reference frequency to the setpoint multiplexers 226, 228, and 230 through lines 234, 236, and 238, respectively. The signal from the sensor multiplexer 222 is then compared within the processer 202 to the adjustable set points corresponding to various desired lubricant levels 90 in the sumps 26 of each of the corresponding compressors 10.

It should be noted that aforementioned circuitry inputs can be accomplishing in several different ways, including the use of RAM and software data, eliminating the need for the set point modules 232.

If the level in the sump 26 is determined to be insufficient, the controller 20 cycles for 10 seconds in an effort to allow the sensed lubricant level 90 to return to the neutral set point. In the next comparison 10 seconds later, assuming the sensed lubricant level 90 is still insufficient, the controller 20 will generate an output signal through a display and output driver 240 to a power output module 242 in electrical communication with the normally closed solenoid 24, causing the normally closed solenoid 24 to open and allow lubricant from the reservoir 40 to flow to the appropriate sump 26 until the proper level is again obtained. An electronic amplifier may be used to boost this output signal of the controller 20.

The controller 20 is further provided with an indicator display 244, as shown in FIG. 11. A signal from the display and output driver 240 is sent to the display 244, deactivating a level indicator light "LEVEL" 246 and activating a feed indication light "VALVE" 248 on the display at this time. If the lubricant level has been brought up to one of the set point levels within 45 seconds, the solenoid 24 will be de-energized, the feed indicator light "VALVE" 248 deactivated, and the level indicator light "LEVEL" 246 reactivated.

If the proper sensed lubricant level 90 has not been reached after a lubricant feed output within 45 seconds, an alarm circuit will be energized and the insufficient level indicator "ALARM" 250 will illuminate. The controller 20 remains in this alarm mode until the sensed lubricant level 90 has been brought back up to the set point level and the sampling cycle resumed. This feature is uniquely suited to identify transient system problems, such as a sticking normally closed solenoid valve 24 or clogged or partially clogged feed lines 48.

As noted above, the controller 20 preferably compares the sensor 22 signal to the set point multiplexers 226, 228, and 230 in 10 second intervals, although other intervals may be used. This is to avoid excessively short duty cycling of the normally closed solenoid valve 24. This provides a smoother control to the normally closed solenoid valve 24, a longer life for the normally closed solenoid valve 24, and avoids oil foaming resulting from fast on/off feeding. The 10 second intervals also allow the refrigeration system itself to correct the sensed lubricant level 90 before erroneously feeding lubricant from the reservoir 40, as some lubricant may be returned from the evaporator.

If the sensed lubricant level 90 is within the set point range, the controller 20 processes an output to the level indicator "LEVEL" 246 telling the operator that the sensed lubricant level 90 is proper and that no lubricant is feeding at that time to that compressor. The controller 20 will compare the sensor 22 signal again in 10 seconds to start the whole cycle over.

During every 10 second cycle, before comparing the sensed lubricant level 90 input to the controller's 20 set point, the processor 202 undertakes a diagnostic check. The processor 202 first determines that it has power, allowing the level indicator "LEVEL" 246 to initially activate. The sensor 22 is then checked for malfunctions. If the sensor 22 signal is present and within acceptable limits, the sensor indication "SENSOR" 252 will activate. If the unit is not in an alarm mode, the controller 20 starts the rest of its processing cycle. If there is a problem, the controller 20 will not identify a signal from the sensor 22 and fail to obtain an output regarding the sensed lubricant level 90. Thus, the sensor indication "SENSOR" 252 will deactivate. At the same time, the controller 20 will fail to identify a corresponding sensor output for comparison to the setpoint multiplexers 226, 228, and 230 within 45 seconds and the "ALARM" 250 indicator will activate. Thus, the indicators can be used to trouble shoot the unit.

The normally closed solenoids 24 are preferably of "bubble tight" shut off design and manufactured by Automatic Switch Company of Florham Park, N.J. (Model Series No. 225). This assures that there is no passage of lubricant through the solenoid valve 24 when it is de-energized. Different size orifices in the valves should be used to obtain control over the flow rates to match the precise refrigeration system needs. This allows further reduction in short duty cycling of the normally closed solenoid valves 24 and reduction in lubricant foaming.

Cycling a positive shut off normally closed solenoid valve 24 offers another advantage over mechanical float valves. The solenoid valve 24 isolates liquid refrigerant which may become entrained in the refrigeration system from the compressor's sump 26. The only time the solenoid valve 24 is open is when the lubricant level 90 is insufficient. In contrast, mechanical float valve-type level control systems often allow liquid refrigerant and/or foaming lubricant to lift the float and allow lubricant and/or liquid refrigerant to flow into the compressor sump 26 when no feed should be occurring. These mechanical float valve-type control systems also allows refrigerant, both in the liquid and gas phase, to bypass through the compressor 10 even when closed due to the lack of a tight shut off.

The controller 20 as shown preferably handles up to five compressors 10, sumps 26, sensors 22, and normally closed solenoids 26 at a time with each having individual control. A central lubricant reservoir 40 is placed in selective fluid communication with each of the lubricant sumps 26 by way of a plurality of corresponding solenoid valves 24. Each of the valves 24 has a normally closed condition and a selectively open condition to maintain the quantity of lubricant in the sumps 26 at a safe level. However, it should be noted that a greater or lesser number of compressors 10, sumps 26, sensors 22, and normally closed solenoids 26 may be controlled according to the present invention.

Although the preferable embodiment has been disclosed herein, it should be noted, however, that the invention disclosed is not limited to any particular structural or analytical configuration, allowing however for the objectives of the present invention. Thus, a displacement transducer sensor 22 and controller 20 combination may be advantageously employed to practice the disclosed invention and meet the aforementioned objects without departing from the spirit and nature of the present invention.

It will be understood that the details, materials and arrangements of the parts of a specific embodiment has been described to explain the nature of the invention. Changes may be made by those skilled in the art without departing from the invention as expressed in the appended claims.

What is claimed is:

1. A lubrication management system comprising:
   a lubricant sump containing a quantity of liquid lubricant subject to fluctuation;
   a sensor reactive to the quantity of lubricant within the lubricant sump to produce an electrical signal representative of the lubricant quantity, the sensor including;
   a. a float member supported by and substantially submerged within the lubricant within a sensor housing in fluid communication with the lubricant sump, the float member further comprising a nonmetallic float portion and a magnetically conductive element operably connected thereto and depending therefrom;
   b. a tubular configuration disposed about the depending magnetically conductive element in fluid communication with the sensor housing such that the magnetically conductive element is centered therein and restrained from lateral motion;
   c. the magnetically conductive element operably connected to the float member being vertically displaceable in accordance with fluctuations in the lubricant quantity; and
   d. electromagnetic means disposed about the magnetically conductive element and the tubular configuration to provide a signal indicative of the motion of the float member; and
   circuitry for receiving the signal and comparing the signal to a predetermined set point from which comparison the circuitry generates an output indicative of the lubricant quantity within the sump.

2. The lubrication management system of claim 1 wherein motion of the magnetically conductive element varies the signal in relation to a predetermined position of the magnetically conductive element relative the electromagnetic means.

3. The lubrication management system of claim 2 wherein the float member is capable of rising or falling within a range of motion, an upper limit of the range of motion corresponding to the sump containing a first quantity of lubricant and a lower limit of the range of motion corresponding to the sump containing a lesser second quantity of lubricant.

4. The lubrication management system of claim 3 further comprising a remote lubricant reservoir and an electrically operated valve, the remote lubricant reservoir being in selective fluid communication with the lubricant sump by way of the valve, and
   the valve being responsive to the circuitry output corresponding to the sump containing the lesser second quantity of lubricant.

5. The lubrication management system of claim 4 wherein the valve is a solenoid valve having a normally closed condition and a selectively open condition, the normally closed condition existing when the circuitry output corresponds to the sump containing the first quantity of lubricant, and
   the open condition existing when the circuitry output corresponds to the sump containing the lesser second quantity of lubricant to allow lubricant flow to the sump from the remote lubricant reservoir.

6. The lubrication management system of claim 4 wherein the valve is a solenoid valve having a normally closed condition and a selectively open condition and an indicator means for signally the open condition of the valve,
   the normally closed condition existing when the circuitry output corresponds to the sump containing the first quantity of lubricant, and
   the open condition existing when the circuitry output corresponds to the sump containing the lesser second quantity of lubricant.

7. The lubrication management system of claim 4 wherein the circuitry includes detection means to verify the existence of the signal from the sensor, and
   alarm means capable of indicating the absence of the signal from the sensor.

8. A lubrication management system comprising:
   a lubricant sump containing a quantity of liquid lubricant subject to fluctuation;
   a lubricant quantity sensor with a float member supported by and substantially submerged within the lubricant within a sensor housing in fluid communication with the lubricant sump, the float member further comprising a nonmetallic float portion and a magnetically conductive element operably connected thereto and depending therefrom;
   a tubular configuration disposed about the depending magnetically conductive element in fluid communication with the sensor housing such that the magnetically conductive element is centered therein and restrained from lateral motion;

the magnetically conductive element adapted to rise or fall within a range of motion relative to the lubricant sump in accordance with fluctuations in the lubricant quantity, the sensor reactive to the quantity of lubricant within the lubricant sump to produce a signal representative of the lubricant quantity through electromagnetic means disposed about the magnetically conductive element adapted for vertical movement motion in accordance with fluctuations in the lubricant quantity and the tubular configuration; and circuitry for receiving the signal and comparing the signal to a predetermined set point from which comparison the circuitry generates an output indicative of the need for additional lubricant delivery to the sump.

9. The lubrication management system of claim 8 wherein motion of the magnetically conductive element causes the signal to vary in relation to a predetermined position of the magnetically conductive element relative to electromagnetic means, and a solenoid valve placed in selective fluid communication between the sump and a remote lubricant reservoir, the valve being controlled by the circuitry output for replenishing the sump from the remote lubricant reservoir through the solenoid valve.

10. The lubrication management system of claim 9 wherein the predetermined set point is adjustable according to a desired first quantity and a lesser second quantity of lubricant within the sump.

11. The invention of claim 10 wherein the electromagnetic means is further comprised of an electrical circuit, the magnetically conductive element depending within the tubular configuration at a first position corresponding with the first desired quantity of lubricant, and the electrical circuit creating a first resonant frequency within the sensor generating a first signal, the magnetically conductive element varying the first signal to a second signal through variation of the resonant frequency when the magnetically conductive element is moved away from the first position corresponding with the first desired quantity of lubricant.

12. The invention of claim 11 wherein varying the first resonant frequency to the second resonant frequency is detected by the circuitry, the circuitry creating in response thereto an output signal to a solenoid valve allowing lubricant to flow from the remote lubricant reservoir to the sump.

13. A lubrication management system comprising:

a lubricant sump containing a quantity of liquid lubricant subject to fluctuation;

a remote lubricant reservoir;

a solenoid valve having a normally closed condition and a selectively open condition; and a sensor with a float member supported by and substantially submerged within the lubricant, the float member comprised of a float element and a magnetically conductive element, the float element adapted to rise or fall within a range of motion relative to the lubricant sump in accordance with lubricant quantity fluctuations and the magnetically conductive element is centered within a tubular configuration in fluid communication with the sump, the tubular configuration further restraining the magnetically conductive element from lateral motion, such that an upper limit of the range of motion corresponding to the sump containing a desired first quantity of lubricant and a lower limit of the range of motion corresponding to the sump containing a lesser second quantity of lubricant, the sensor further comprising an electromagnetic means disposed about the magnetically conductive element and the tubular configuration to generate a signal related to the position of the magnetically conductive element and indicative of the motion of the float member; and circuitry for receiving the signal and comparing the signal to a predetermined set point from which comparison the circuitry generates an output suitable for indicating the lubricant quantity within the sump, the remote lubricant reservoir being in selective fluid communication with the lubricant sump by way of the solenoid valve, the solenoid valve being responsive to the circuitry output, the solenoid valve normally closed condition existing when the output corresponds to the sump containing the first desired quantity of lubricant, and the solenoid valve open condition existing when the output corresponds to the sump having the lesser second quantity of lubricant.

14. A lubrication management system comprising:

a lubricant sump containing a quantity of liquid lubricant subject to fluctuation;

a lubricant quantity sensor with a float member supported by and substantially submerged within the lubricant, the float member provided with an magnetically conductive element adapted to rise or fall within a range of motion relative to the lubricant sump in accordance with fluctuations in the lubricant quantity, the float member being disposed within a sensor housing in fluid communication with the lubricant sump, the float member further comprising a nonmetallic float portion and the magnetically conductive element operably connected thereto and depending therefrom;

a tubular configuration disposed about the depending magnetically conductive element in fluid communication with the sensor housing such that the magnetically conductive element is centered therein and restrained from lateral motion;

the sensor being reactive to the quantity of lubricant within the lubricant sump through electromagnetic means disposed about the magnetically conductive element and the tubular configuration to induce a signal representative of the lubricant quantity through the magnetically conductive element for vertical movement motion in accordance with fluctuations in the lubricant quantity; and circuitry for receiving the signal and comparing the signal to an adjustable set point from which comparison the circuitry generates an output suitable for indicating the lubricant quantity within the sump, the lubricant management system further including a solenoid valve responsive to the output placed in selective fluid communication between the sump and a remote lubricant reservoir through the valve as controlled by the circuitry.

15. A lubrication management system for a plurality of refrigeration compressors comprising:
   a lubricant sump containing a quantity of lubricant subject to fluctuation;
   a sensor with a float member supported by and substantially submerged within the lubricant, the float member being capable of rising or falling within a range of motion relative to the lubricant sump in accordance with fluctuations in the lubricant level, and the float member provided with an magnetically conductive element concentrically disposed within a tubular configuration for restraining lateral motion thereof, the magnetically conductive portion adapted to rise or fall within a range of motion relative to the lubricant sump in accordance with fluctuations in the lubricant quantity,
   the sensor relative to the quantity of lubricant within the lubricant sump through electromagnetic means disposed about the magnetically conductive element and the tubular configuration to induce a signal representative of the lubricant quantity through the magnetically conductive element for vertical movement motion in accordance with fluctuations in the lubricant quantity; and
   circuitry for receiving the signal and comparing the signal to an adjustable set point from which comparison the circuitry generates an output suitable for signalling the lubricant quantity within the sump.

16. The lubrication management system of claim 15 wherein the signal varies in relation to the position of the magnetically conductive portion relative the electromagnetic means.

17. The lubrication management system of claim 16 wherein the float member is capable of rising or falling within a range of motion, an upper limit of the range of motion corresponding to the sump containing a first quantity of lubricant and a lower limit of the range of motion corresponding to the sump containing a lesser second quantity of lubricant.

18. The lubrication management system of claim 17 further comprising a remote lubricant reservoir and an electrically operated valve, the remote lubricant reservoir being in selective fluid communication with the lubricant sump by way of the valve, and
   the valve being responsive to the circuitry output corresponding to the sump containing the lesser second quantity of lubricant.

19. The lubrication management system of claim 18 wherein the valve is a solenoid valve having a normally closed condition and a selectively open condition, the normally closed condition existing where the circuitry output corresponds to the sump containing the first quantity of lubricant, and
   the open condition existing when the circuitry output corresponds to the sump containing the lesser second quantity of lubricant.

20. The lubrication management system of claim 18 wherein the valve is a solenoid valve having a normally closed condition and a selectively open condition, the normally closed condition existing when the circuitry output corresponds to the sump containing the first quantity of lubricant, and
   the open condition existing when the circuitry output corresponds to the sump containing the lesser second quantity of lubricant to fill the sump from the remote lubricant reservoir.

21. The lubrication management system of claim 18 wherein the valve is a solenoid valve having a normally closed condition and a selectively open condition and an indicator means for signally the open condition of the valve,
   the normally closed condition existing when the circuitry output corresponds to the sump containing the first quantity of lubricant, and
   the open condition existing when the circuitry output corresponds to the sump containing the lesser second quantity of lubricant.

22. The lubrication management system of claim 18 wherein the circuitry includes detection means to verify the existence of the signal, and
   alarm means capable of indicating the absence of the signal.

23. A lubrication management system for a plurality of refrigeration compressors comprising:
   a lubricant sump in each of the compressors containing a quantity of lubricant subject to fluctuation,
   a common remote lubricant reservoir, and
   a plurality of solenoid valves each dedicated to each of the compressor sumps and each having a normally closed condition and a selectively open condition, the lubricant reservoir being in selective fluid communication with each of the lubricant sumps by way of the corresponding solenoid valve;
   the lubricant sumps further including a sensor with a float member supported by and substantially submerged within the lubricant, the float member being capable of rising or falling within a range of motion relative to the lubricant sump in accordance with fluctuations in the lubricant level, and the float member provided with an magnetically conductive element adapted to rise or fall within a tubular configuration over a range of motion relative to the lubricant sump in accordance with fluctuations in the lubricant quantity, the tubular configuration concentrically located about the magnetically conductive element and restraining the magnetically conductive element from lateral motion;
   an upper limit in the range of motion corresponding to the sump containing a first desired quantity of lubricant and a lower limit in the range of motion corresponding to the sump containing a lesser second quantity of lubricant,
   the sensor being reactive to the quantity of lubricant within the lubricant sump through electromagnetic means disposed about the magnetically conductive element and the tubular configuration to generate a signal representative of the lubricant quantity through the magnetically conductive element for vertical movement motion in accordance with fluctuations in the lubricant quantity; and
   circuitry for receiving the signal and comparing the signal to an adjustable set point from which comparison the circuitry generates an output suitable for indicating the lubricant quantity within the sump,
   the solenoid valves being responsive to the circuitry output corresponding to the sump containing the lesser second quantity of lubricant such that the solenoid valve open condition exists when the output corresponds to the sump having the lesser second quantity of lubricant.

24. A lubricant management system for controlling refrigeration compressors, the system comprising:

a compressor lubricant sump in fluid communication with a sensor housing;

the sensor housing containing therein a float assembly, the float assembly being supported by and substantially submerged within the lubricant, the float assembly further including a magnetically conductive element concentrically disposed within a tubular configuration for preventing lateral motion of the magnetically conductive element and allowing vertical motion of the magnetically conductive element in response to variations of a lubricant level in the sensor housing;

a variable transducer disposed about the float assembly, the tubular configuration and the magnetically conductive element for generating an output signal indicative of the vertical position of the magnetically conductive element;

circuitry for analyzing the output signal of the transducer and capable of generating a command signal in response thereto;

a remote common lubricant reservoir; and a normally closed positive shut-off solenoid valve in electrical combination with the circuitry and selective fluid communication with the sump such that displacement of the float assembly in the downward direction results in a transducer output signal to the circuitry causing the circuitry to generate a command signal to the solenoid to open the solenoid and allow flow of lubricant to the sump from the common remote reservoir.

25. The lubricant management system of claim 24 wherein the sump was originally provided with a slight glass, the sensor housing containing therein the float assembly being adapted to mount to the sump as a replacement to the original sight glass.

26. A method for managing a lubrication system comprising the steps of:

providing a lubricant sump with a quantity of liquid lubricant subject to fluctuation;

sensing the lubricant level through a sensor having a float element and magnetically conductive element supported by and substantially submerged within the lubricant, the float member being capable of rising or falling from a neutral position relative the lubricant sump in accordance with the fluctuations, the magnetically conductive element being concentrically disposed within a tubular configuration, the tubular configuration allowing vertical motion of the magnetically conductive element in response to the fluctuations and restraining the magnetically conductive element from lateral motion;

generating a signal within an electromagnetic configuration representative of the position of the magnetically conductive element relative the neutral position;

receiving the signal through circuitry capable of comparing the signal to an adjustable predetermined set point corresponding to the neutral position; and determining an output from the circuitry, the output capable of providing additional lubricant to the sump through energization of a solenoid valve placed in selective lubricant communication between the sump and a remote reservoir for replenishing the quantity of lubricant when the signal indicates that the magnetically conductive element has moved below the adjustable predetermined set point.

* * * * *